(12) United States Patent
Morita et al.

(10) Patent No.: US 8,136,859 B2
(45) Date of Patent: Mar. 20, 2012

(54) PICK-UP STYLE UTILITY VEHICLE WITH EXPANDABLE CARGO BED

(75) Inventors: Hirokazu Morita, Kakogawa (JP); Hiroyuki Iwai, Kobe (JP); Masaki Tanaka, Hirakata (JP); Wayne Schafer, Lincoln, NE (US)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 99 days.

(21) Appl. No.: 12/648,587

(22) Filed: Dec. 29, 2009

(65) Prior Publication Data

US 2011/0156427 A1    Jun. 30, 2011

(51) Int. Cl.
*B62D 33/02*    (2006.01)
(52) U.S. Cl. ............... 296/26.11; 296/24.43; 296/183.2; 296/186.4; 296/64
(58) Field of Classification Search ............... 296/26.08, 296/26.11, 186.4, 24.43, 24.4, 190.11, 37.6, 296/37.8, 183.2
See application file for complete search history.

(56) References Cited

U.S. PATENT DOCUMENTS

| | | | | |
|---|---|---|---|---|
| 4,070,056 A * | 1/1978 | Hickman | ..................... | 296/148 |
| 5,161,700 A * | 11/1992 | Stannis et al. | ................. | 211/175 |
| 6,398,291 B1 * | 6/2002 | Reusswig et al. | .......... | 296/186.4 |
| 6,422,567 B1 * | 7/2002 | Mastrangelo et al. | ........ | 296/37.1 |
| 6,481,772 B1 * | 11/2002 | Tenn | .......................... | 296/26.11 |
| 6,513,863 B1 * | 2/2003 | Renke et al. | ............. | 296/190.11 |
| 6,520,562 B2 * | 2/2003 | Pyo | ............................ | 296/183.1 |
| 6,523,880 B1 * | 2/2003 | Yako | ............................ | 296/97.1 |
| 6,598,921 B2 * | 7/2003 | Seel et al. | .................. | 296/24.43 |
| 6,742,834 B1 * | 6/2004 | Merritt et al. | ............ | 296/190.11 |
| 6,773,054 B2 * | 8/2004 | Martini | ........................ | 224/275 |
| 6,779,824 B1 * | 8/2004 | Lazarevich et al. | ............. | 296/50 |
| 6,786,535 B1 * | 9/2004 | Grzegorzewski et al. | ........................ | 296/190.11 |
| 6,796,600 B1 * | 9/2004 | Ferer et al. | ................. | 296/146.1 |
| 6,824,029 B2 * | 11/2004 | Tuel et al. | ..................... | 224/275 |
| 6,851,741 B1 * | 2/2005 | Burg | ........................ | 296/190.11 |
| 6,905,159 B1 * | 6/2005 | Saito et al. | ............... | 296/65.01 |
| 6,929,306 B2 * | 8/2005 | Mack et al. | ................ | 296/65.09 |
| 6,994,388 B2 * | 2/2006 | Saito et al. | .................... | 296/26.1 |
| 7,048,320 B2 * | 5/2006 | Rubel et al. | .................. | 296/37.6 |
| 7,097,224 B2 * | 8/2006 | Lester et al. | ............... | 296/37.14 |
| 7,249,798 B2 | 7/2007 | Saito et al. | | |
| 7,599,593 B2 * | 10/2009 | Harris et al. | .................. | 385/129 |
| 7,686,379 B2 * | 3/2010 | Lemieux | ....................... | 296/148 |
| 7,841,639 B2 * | 11/2010 | Tanaka et al. | .............. | 296/65.05 |

* cited by examiner

*Primary Examiner* — Glenn Dayoan
*Assistant Examiner* — Gregory Blankenship
(74) *Attorney, Agent, or Firm* — Wenderoth, Lind & Ponack, LLP (57) ABSTRACT

A pick-up style utility vehicle having a front seat, a rear seat, and a cargo bed in this order from the front of the vehicle. The cargo bed is changeable between an expanded state in which the cargo bed is expanded forward into a rear riding space in front of the cargo bed and a non-expanded state not occupying the rear riding space. The utility vehicle has load storing devices in the leg space of the rear seat which serves as a load storing space in the expanded state.

16 Claims, 13 Drawing Sheets

PICK-UP STYLE UTILITY VEHICLE WITH EXPANDABLE CARGO BED

BACKGROUND OF THE INVENTION

1. Field of the Invention

The present invention relates to a pick-up style utility vehicle which can expand a cargo bed in a front direction so as to optimize an area or capacity of a cargo bed space or a passenger space according to user demands.

2. Description of the Related Art

At present, utility vehicles of various styles are used. Other than a pick-up style utility vehicle with a relatively large cargo bed behind a seat, there is a straddle-type all terrain vehicle having a handle bar, or the like.

Typically, the pick-up style utility vehicle is more practical than the handle bar type utility vehicle belonging to the straddle-type all terrain vehicles. The pick-up style utility vehicle is used for hunting in fields and mountains, conveyance of lumber, movement in golf courses, golf course maintenance, and the like.

The present applicants have formerly developed inventions relating to the pick-up style utility vehicle with a cargo bed whose area or capacity can be expanded. Their applications have been granted patents, which are, for example, U.S. Pat. Nos. 6,905,159, 6,994,388, and 7,249,798.

A configuration of the pick-up style utility vehicle disclosed in the respective documents has a front seat including a driver's seat, a rear seat, and a cargo bed in this order from the front. The rear seat can be changed between a used state and a retracted state to switch between a 2 passengers transformation and a 4 passengers transformation. In the 2 passengers transformation, a front portion of the cargo bed can be expanded into a riding space occupied by the rear seat in the used state.

Figure 20:
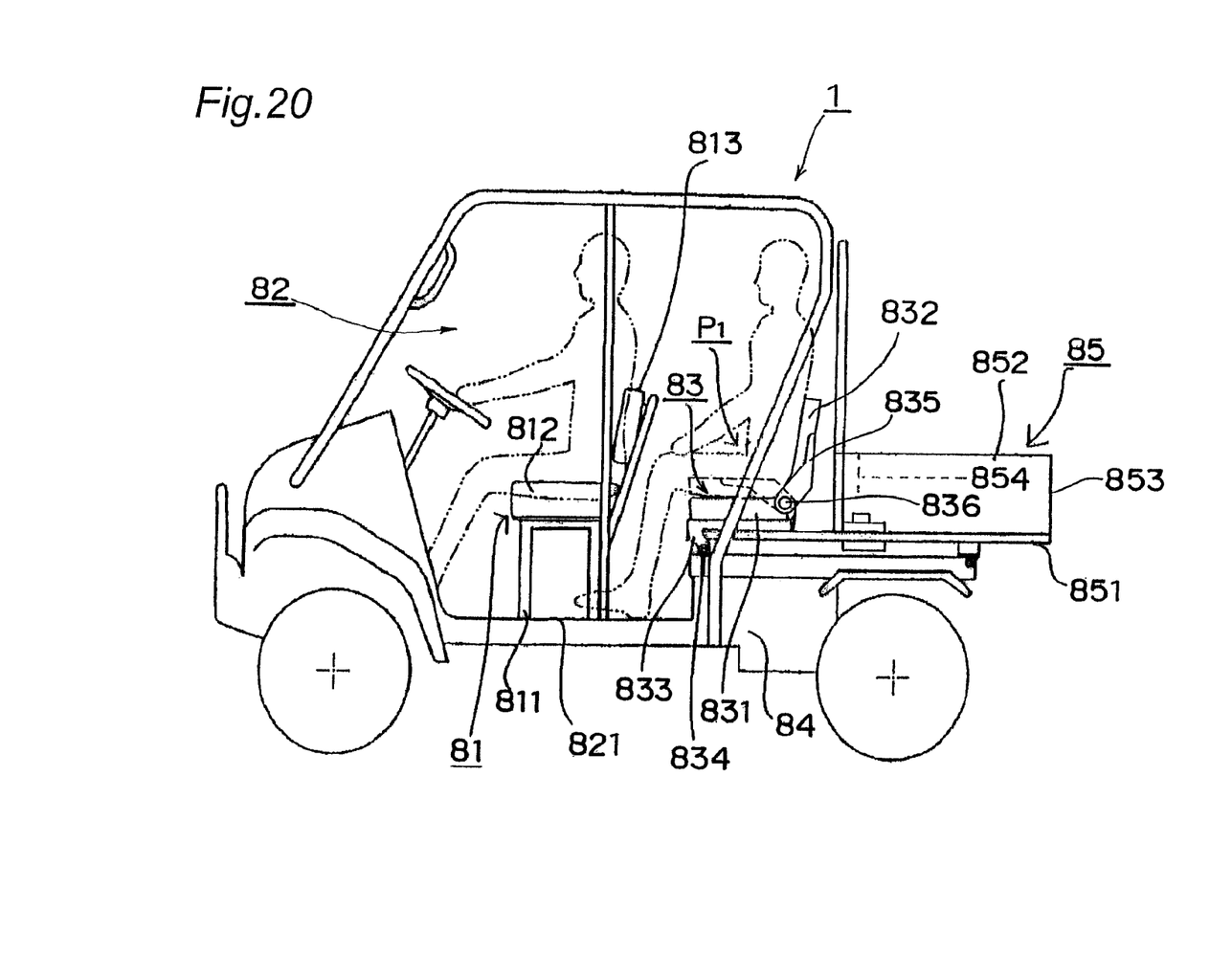
FIG. 20 is a left side view of a pick-up style utility vehicle of the related art in the 4 passengers transformation.

FIG. 20 is a left side view in the 4 passengers transformation of a pick-up style utility vehicle disclosed in the related art documents. A bench-shaped front seat 81 has a seat leg 811 erected on a floor surface 821 of a cabin 82, a seat bottom 812 provided on the upper end face of the seat leg 811, and a backrest 813 fixed via supporting stays to the seat bottom 812. The bench-shaped front seat 81 is typically extended leftward and rightward to near the left and right ends of the cabin 82, so that two persons can be seated side by side. A driver can be seated on one seating area (left side) and a passenger can be seated on the other seating area. A bench-shaped rear seat 83 has a seat bottom 831 arranged on the upper side of a box 84 housing an engine (not shown) and a backrest 832. Like the front seat 81, the seat bottom 831 and the backrest 832 are extended leftward and rightward to near the left and right ends of the cabin 82, so that two persons can be seated side by side.

The folding configuration of the rear seat 83 will be described in detail. The seat bottom 831 is fixed onto the upper surface of a supporting base 833. The front end of the supporting base 833 is rotatably supported at the front upper end of the box 84 via a hinge 834. A pair of right and left stays 835 extended in a downward direction is fixed onto the backrest 832. The lower end of each of the stays 835 is rotatably coupled to the rear end of the seat bottom 831 via a hinge 836.

Figure 21:
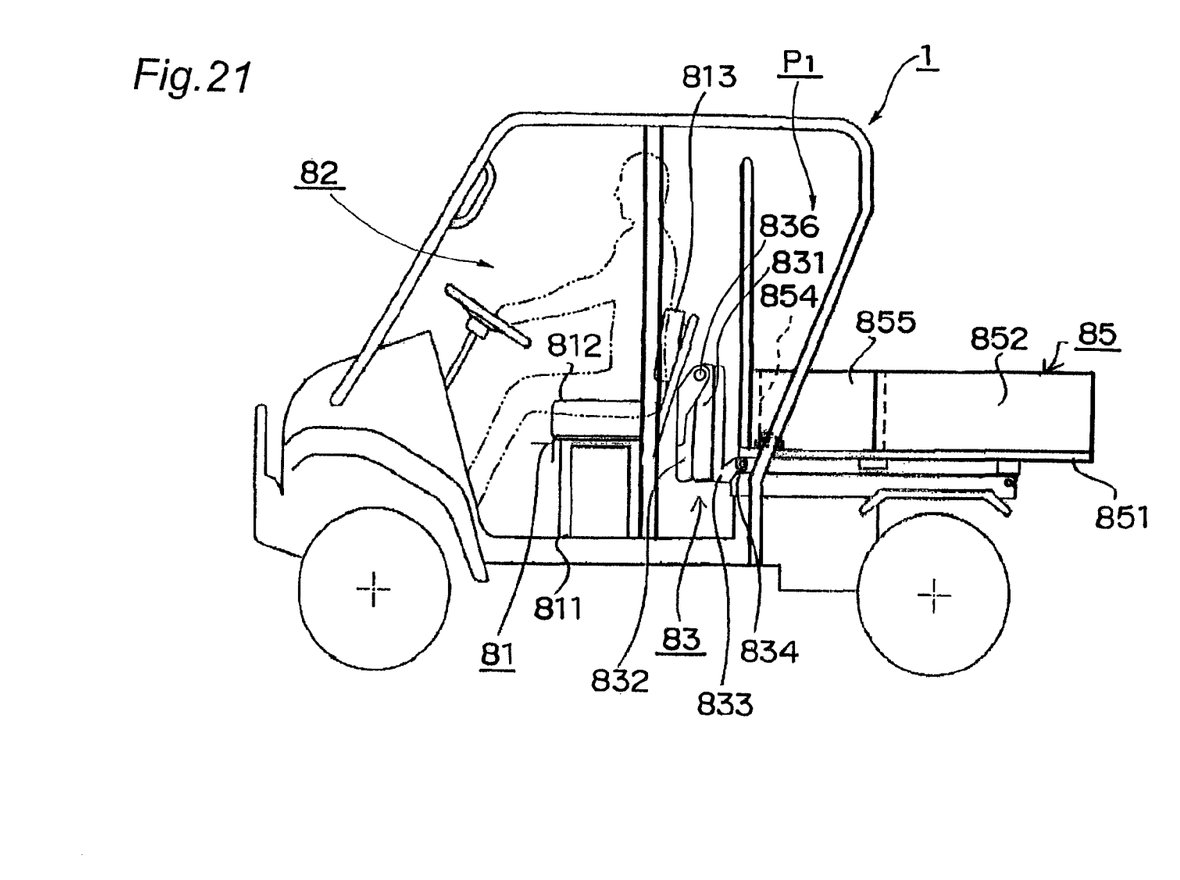
FIG. 21 is a left side view of the pick-up style utility vehicle of the related art in the 2 passengers transformation.

FIG. 21 is a left side view in the 2 passengers transformation of a pick-up style utility vehicle disclosed in the related art documents. The backrest 832 is rotated about the hinge 836 so as to be brought into contact with the upper surface of the seat bottom 831. The seat bottom 831 is then rotated about the hinge 834 together with the backrest 832 so as to be substantially vertical. The rear seat 83 is folded in the retracted state. The rear seat 83 is folded and retracted to use a rear portion riding space P1 as the forward expanded space of a cargo bed 85.

When the related art pick-up style utility vehicle is changed from the 4 passengers transformation to the 2 passengers transformation to expand the cargo bed 85, the rear seat 83 is folded and retracted. The expanded space of the cargo bed 85 is reduced by the thickness of the rear seat 83.

SUMMARY OF THE INVENTION

The present invention has been made in view of the above problems and an object of the present invention is to improve the loading ability of a pick-up style utility vehicle in an expanded state in the 2 passengers transformation.

To achieve the above object, the present invention provides a pick-up style utility vehicle having a front seat, a rear seat, and a cargo bed in this order from the front of the vehicle. The cargo bed is changeable between an expanded state in which the cargo bed is expanded forward to a rear riding space in front of the cargo bed and a non-expanded state not occupying the rear riding space, and the pick-up style utility vehicle has load storing means forming a leg space of the rear seat as a load storing space in the expanded state.

With the above configuration, the load storing space is formed in an unused space of the related art vehicle. The load loading ability of the pick-up style utility vehicle in the expanded state of the cargo bed can be improved.

According to the present invention, preferably, the leg space of the rear seat is partitioned from the left or right side outward of a vehicle body in the expanded state, and the leg space of the rear seat is opened to the left or right side outward of the vehicle body in the non-expanded state.

With the above configuration, the load loading ability can be improved in the expanded state of the cargo bed, and the passenger can easily enter and exit the rear seat in the non-expanded state of the cargo bed.

According to the present invention, preferably, the load storing means has a partitioning member attached to a cabin frame surrounding the riding space so as to partition the riding space and the left or right side outward of the vehicle body.

With the above configuration, the load storing space is formed by the partitioning member. The load storing space can be easily formed.

According to the present invention, preferably, in the configuration in which the load storing means has a partitioning member attached to a cabin frame surrounding the riding space so as to partition the riding space and the left or right side outward of the vehicle body, the partitioning member is formed along the left or right outer surface of the vehicle body.

With the above configuration, the load storing space can be larger than that of the case in which the partitioning member is formed inward in a vehicle width direction rather than on the left or right outer surface. Therefore, the quantity of loads that can be stored in the load storing space can be increased.

According to the present invention, preferably, in the configuration in which the load storing means has a partitioning member attached to a cabin frame surrounding the riding space so as to partition the riding space and the left or right side outward of the vehicle body, the partitioning member has a rod shape.

With the above configuration, the partitioning member has a rod shape. The partitioning member can be easily formed.

According to the present invention, preferably, in the configuration in which the load storing means has a partitioning member attached to a cabin frame surrounding the riding space so as to partition the riding space and the left or right side outward of the vehicle body, the longitudinal size of the partitioning member is changeable.

With the above configuration, the longitudinal size of the partitioning member can be changed. Accordingly, the partitioning member is contracted in the non-expanded state of the cargo bed, and thus the passenger can easily enter and exit the rear seat.

According to the present invention, preferably, in the configuration in which the load storing means has a partitioning member attached to a cabin frame surrounding the riding space and partitioning the riding space and the left or right side outward of the vehicle body, the partitioning member has a plate shape.

With the above configuration, a small load which passes through the rod-shaped partitioning member can be stored.

According to the present invention, preferably, in the configuration in which the load storing means has a partitioning member attached to a cabin frame surrounding the riding space and partitioning the riding space and the left or right side outward of the vehicle body, the partitioning member has a windable roll screen shield.

With the above configuration, the partitioning member has the windable roll screen shield. Therefore, when the load storing means is not used, the roll screen shield is wound so that it cannot be an obstacle. In addition, the roll screen shield can store a small load which passes through the rod-shaped partitioning member and can make the weight of the partitioning member smaller than that of the plate-shaped partitioning member.

According to the present invention, preferably, the load storing means has a tray attachable to the vehicle body.

With the above configuration, the load storing means is attachable to the vehicle body, so that the load storing space can be easily formed.

According to the present invention, preferably, in the configuration in which the load storing means has a tray attachable to the vehicle body, the tray can be housed below the cargo bed in the non-expanded state.

With the above configuration, the tray can be housed below the cargo bed in the non-expanded state of the cargo bed, so that the tray does not become an obstacle and can be retracted in the non-expanded state.

According to the present invention, preferably, the load storing means has a net member attachable to the vehicle body.

With the above configuration, the load storing means is attachable to the vehicle body, so that the load storing space can be easily formed. In addition, the net member can be formed in various shapes, and thus loads in various shapes can be stored by the net member.

According to the present invention, preferably, the rear seat has a seat bottom and a backrest, the load storing means has a plate-shaped member, the plate-shaped member is attached to the end of the backrest. The backrest is located on the top surface of the seat bottom in a substantially horizontal state in the expanded state, and the plate-shaped member is extended forward from the front end of the backrest in a substantially horizontal state and is located in the upper portion of the load storing space.

With the above configuration, the backrest and the plate-shaped member can form the bottom plate of the expandable portion of the cargo bed. In addition, the plate-shaped member is located in the upper portion of the load storing space and can cover the upper portion of a load stored in the load storing space. Therefore, bouncing of the stored load outward can be prevented.

The present invention provides a pick-up style utility vehicle having a front seat, a rear seat, and a cargo bed in this order from the front of the vehicle. The cargo bed is changeable between an expanded state in which the cargo bed is expanded forward to a rear riding space in front of the cargo bed and a non-expanded state not occupying the rear riding space, and the utility vehicle has first load storing means forming a leg space on a passenger seat side of the front seat as a load storing space in the expanded state and the non-expanded state and second load storing means forming a leg space of the rear seat as a load storing space in the expanded state.

With the above configuration, the load storing space is formed in an unused space of the related art, and thus the load loading ability of the pick-up style utility vehicle can be improved.

DETAILED DESCRIPTION OF THE PREFERRED EMBODIMENTS

[First embodiment of the present invention]

Figure 1:
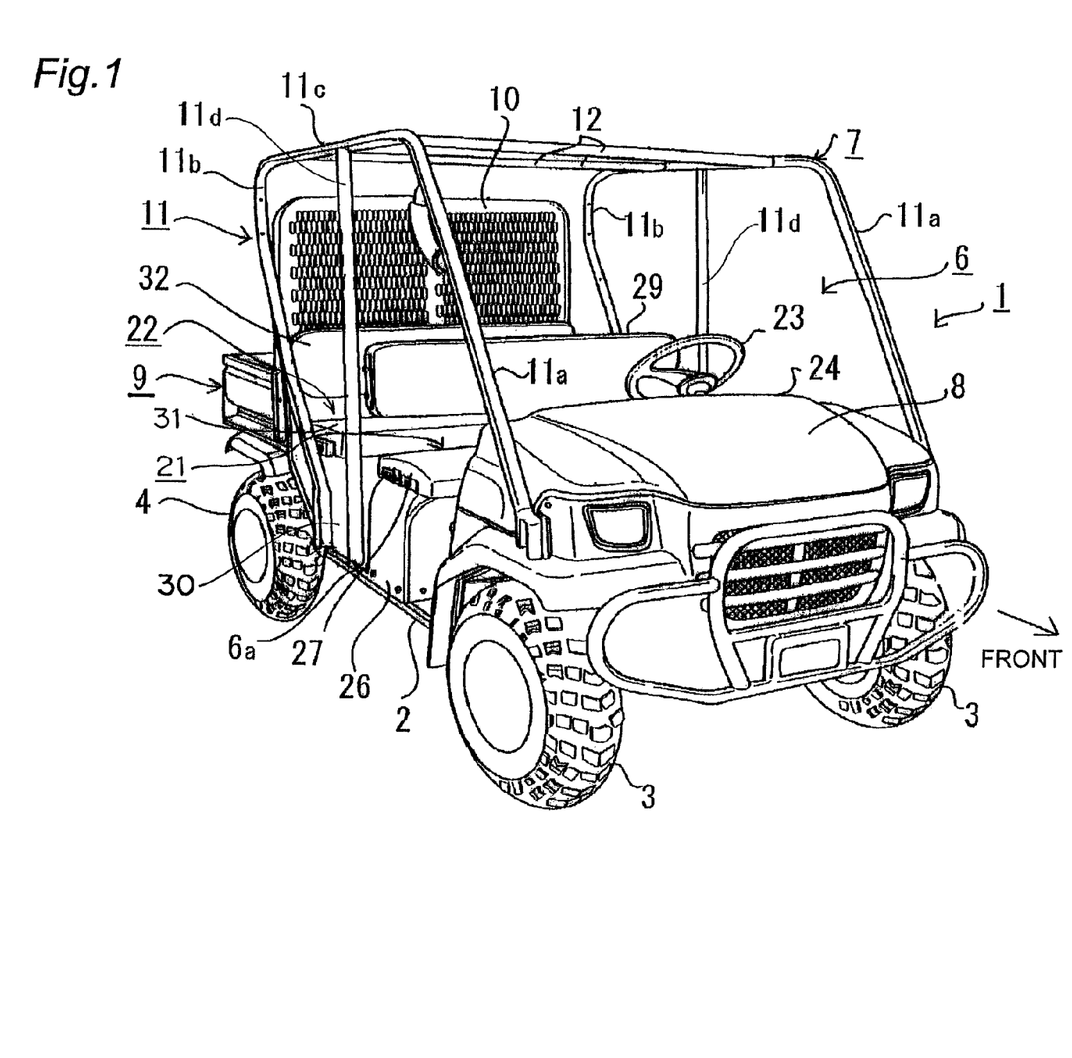
FIG. 1 is an overall perspective view of a pick-up style utility vehicle according to a first embodiment of the present invention.
Figure 2:
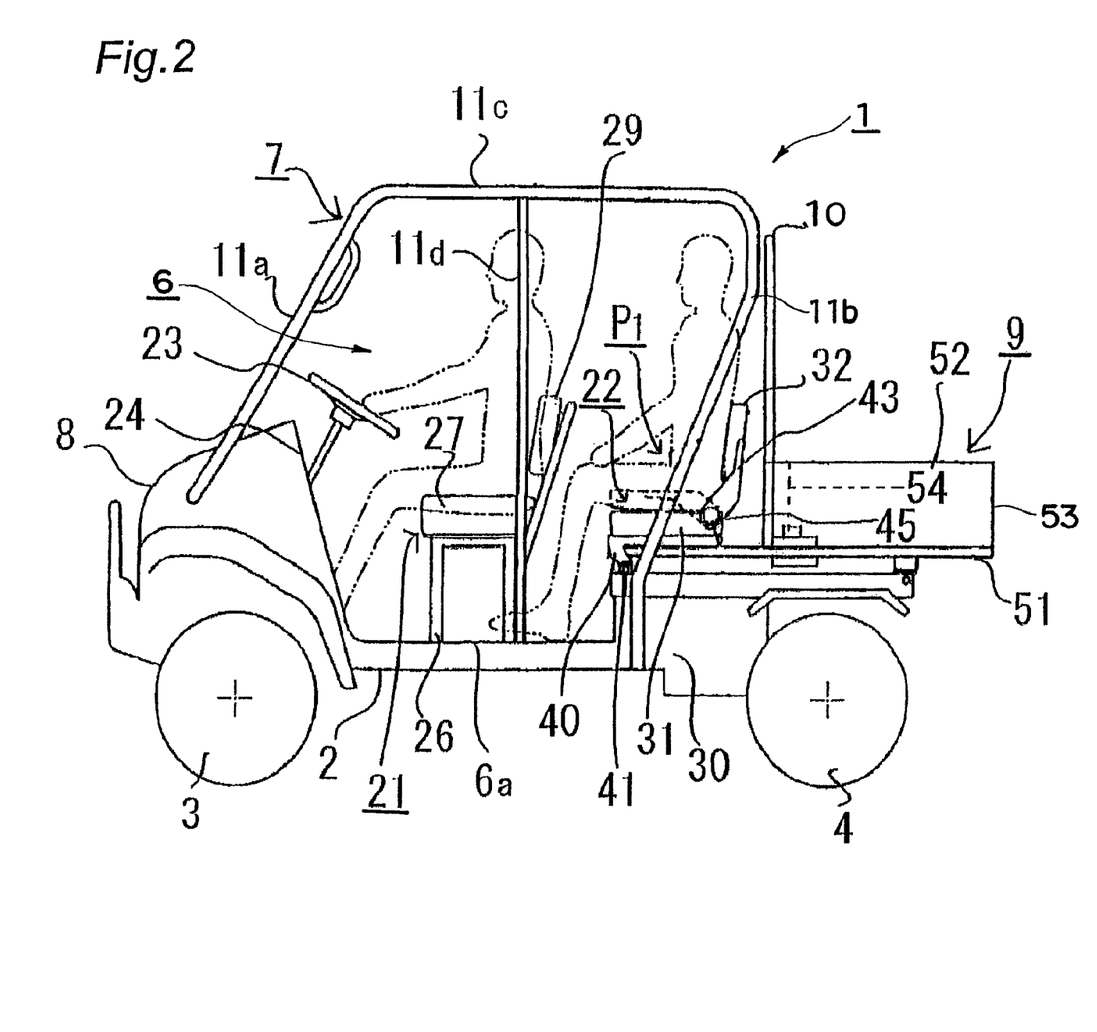
FIG. 2 is a left side view of the pick-up style utility vehicle in a 4 passengers transformation.
Figure 3:
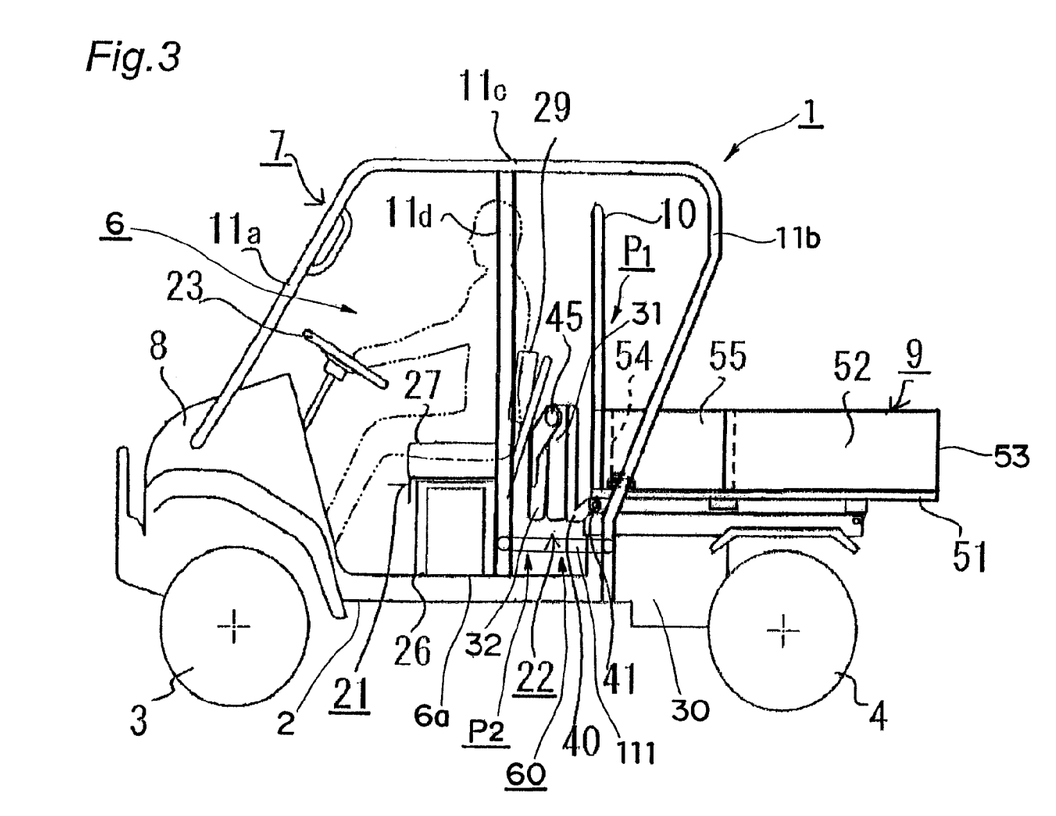
FIG. 3 is a left side view of the pick-up style utility vehicle in a 2 passengers transformation.

FIGS. 1 to 3 show a pick-up style utility vehicle 1 with an expandable cargo bed according to a first embodiment of the present invention. The pick-up style utility vehicle 1 is changeable between a 4 passengers transformation contracting a cargo bed 9, as shown in FIG. 2 and a 2 passengers transformation expanding the cargo bed 9 forward, as shown in FIG. 3. The configuration of the pick-up style utility vehicle will be described below in detail with reference to the drawings.

FIG. 1 is a perspective view of the pick-up style utility vehicle 1. The pick-up style utility vehicle 1 has a vehicle body 2 supported by a pair of left and right front wheels 3 and a pair of left and right rear wheels 4. A cabin frame 7 configuring a cabin 6 is provided on an intermediate portion on the vehicle body 2 in a front-rear direction. A hood 8 is provided in front of the cabin frame 7. The cargo bed 9 is provided behind the cabin frame 7. A screen shield 10 partitioning the cargo bed 9 and a riding space is provided at the front end of the cargo bed 9 so as to be position changeable forward and rearward.

The cabin frame 7 surrounding the cabin 6 has a pair of left and right side frame members 11 formed in an inverted U-shape and made of metal pipes, and a cross frame member 12 made of a plurality of metal pipes coupling the side frame members 11. Each of the side frame members 11 has a front side portion 11a extended rearward and upward from near the left or right side portion of the hood 8, a rear side portion 11b extended substantially upward from the left or right side portion at the rear end of the cabin 6, an upper side portion 11c integrally coupling the upper end of the front side portion 11a and the upper end of the rear side portion 11b and extended forward and rearward, and an intermediate vertical portion 11d coupling an intermediate portion of the upper side portion 11c in a front-rear direction and a floor surface 6a.

A bench-shaped front seat 21 is installed in the front half portion of the cabin 6. A bench-shaped rear seat 22 is installed in the rear half portion of the cabin 6. A dashboard (operating portion) 24 having a steering wheel 23 and the like is provided at the front end of the cabin 6.

The bench-shaped front seat 21 has a seat leg 26 erected on the floor surface 6a of the cabin 6, a seat bottom 27 provided on the upper end face of the seat leg 26, and a backrest 29 fixed via supporting stays to the intermediate vertical portions 11d. The bench-shaped front seat 21 is typically extended leftward and rightward to near the left and right ends of the cabin 6, so that two persons can be seated side by side. A driver can be seated on one seating area (left side) and a passenger can be seated on the other seating area.

The bench-shaped rear seat 22 is arranged on the upper side of a box 30 storing an engine (not shown). The rear seat 22 has a seat bottom 31 and a backrest 32. Like the front seat 21, the seat bottom 31 and the backrest 32 are extended leftward and rightward to near the right and left ends of the cabin 6 so that two passengers can be seated side by side.

The configuration of the rear seat 22 will be described below. The seat bottom 31 is fixed to the upper surface of a supporting base 40. The front end of the supporting base 40 is rotatably supported at the front upper end of the box 30 via a hinge 41. A pair of left and right stays 43 extended downward is fixed to the backrest 32. The lower end of each of the stays 43 is rotatably coupled to the rear end of the seat bottom 31 via a hinge 45.

FIG. 3 is a left side view of the pick-up style utility vehicle 1 in the 2 passengers transformation and shows the state in which the rear seat 22 is retracted. As shown in FIG. 3, the backrest 32 is rotated about the hinge 45 so as to be brought into contact with the top surface of the seat bottom 31, and the seat bottom 31 is rotated about the hinge 41 so as to be in a substantially vertical state together with the backrest 32 so that the rear seat 22 is folded in a retracted state. In this manner, the rear seat 22 is folded and retracted, so that a rear riding space P1 can be used as the forward expanded space of the cargo bed 9.

The cargo bed 9 has, as a basic configuration, a stationary bottom plate 51, a pair of stationary side panels 52 provided substantially perpendicular to the stationary bottom plate 51 along the left and right ends of the stationary bottom plate 51, an openable and closeable gate type rear panel 53 provided at the rear end of the stationary bottom plate 51, and a front panel 54 that is adjustable in the forward and rearward direction. In addition to these members, as shown in FIG. 3, the cargo bed 9 has a pair of left and right expandable side panels 55 to expand the cargo bed 9 forward.

A leg space, in which the legs of a passenger seated on the rear seat 22 are located, is formed in the non-expanded state of the cargo bed 9 of the utility vehicle 1. The utility vehicle 1 is not provided with a partition such as a door and panel arranged to the left or right outward of the rear seat 22 in a vehicle width direction in order that the passenger can easily enter and exit the rear seat 22. In other words, in the non-expanded state, the leg space is open to the left or right outward. In this way, in the non-expanded state, the partition such as a door and panel is not provided. The passenger can easily enter and exit the rear seat 22 without straddling the partition and opening or closing it.

Load storing means 60 of a load storing space P2 provided in the leg space of the rear seat 22 in the 2 passengers transformation will be described below.

As shown in FIG. 3, a left or right partition 111 for preventing the dropping of a load, which couples the intermediate vertical portion 11d and the rear side portion 11b of the side frame member 11 is provided near the left or right end of the load storing space P2. The partition 111 is rod-shaped and is attachable to and detachable from the intermediate vertical portion 11d and the rear side portion 11b.

As described above, in this embodiment, the partition 111 is provided, so that a load can be loaded into the load storing space P2 in the leg space of the rear seat 22 in the 2 passengers transformation. In other words, the dropping or shifting of a load loaded into the load storing space P2 out of the left end or right end of the vehicle in a vehicle width direction can be prevented by the partition 111.

The partition 111 is provided so as to be attachable to and detachable from the side frame member 11. Therefore, the partition 111 is detached in the 4 passengers transformation so that it will not be an obstacle when the passenger enters and exits the rear seat 22. The partition 111 is provided so as to be attachable to and detachable from the side frame member 11.

Therefore, a load can be loaded into or unloaded from the left or right side outward of the vehicle body by detaching the partition 111.

Figure 4:
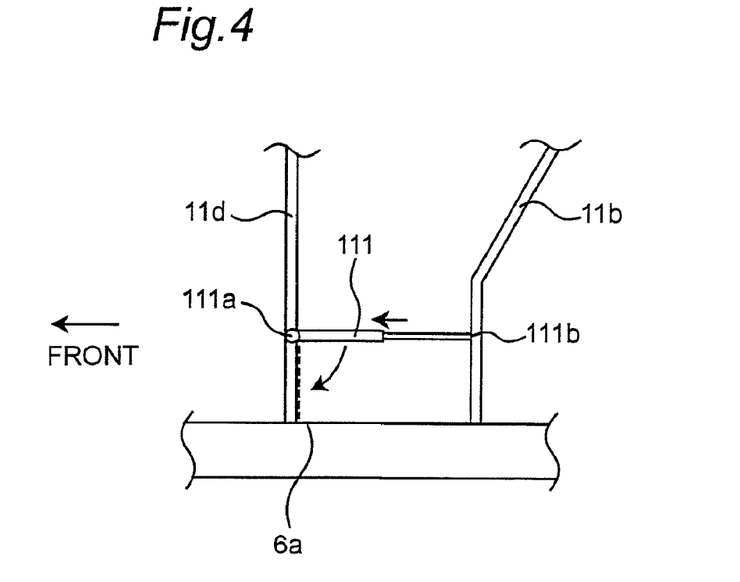
FIG. 4 is a left side schematic diagram of load storing means which can expand and contract a partition.

The partition 111 may be expandable or contractible. FIG. 4 shows a left side schematic diagram of the load storing means which can expand and contract the partition 111. When expandable, the partition 111 is extended from the intermediate vertical portion 11d to the rear portion 11b of the side frame member 11 in the expanded state to partition the leg space from the left or right side outward of the vehicle body. The partition 111 is supported so that one end 111a can be angle shifted about a horizontal shaft in relation to the intermediate vertical portion 11d. The other end 111b is formed so as to be attachable to and detachable from the rear side portion 11b.

When the partition 111 is provided so as to be expandable and contractible, the partition 111 can be easily attached to and detached from the side frame member 11.

Figure 5:
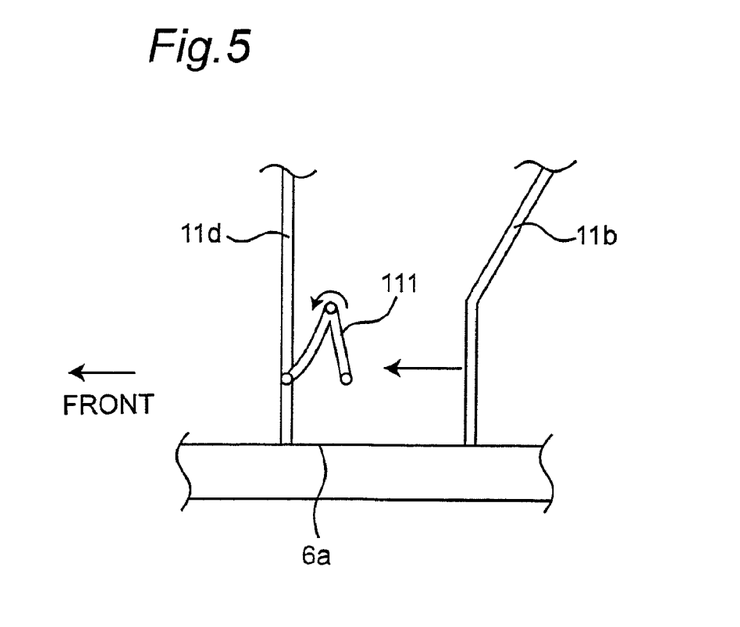
FIG. 5 is a left side schematic diagram of the load storing means which can bend the partition in its intermediate portion.

As shown in FIG. 5, the partition 111 may be formed of a configuration that is bendable in its intermediate portion in place of the expandable and contractable configuration. The other end of the partition 111 is detached from the side frame member 11, and the partition 111 is contracted to angle shift 90° about one end. Thus, the state of partitioning the leg space by the partition 111 can be released.

Figure 6:
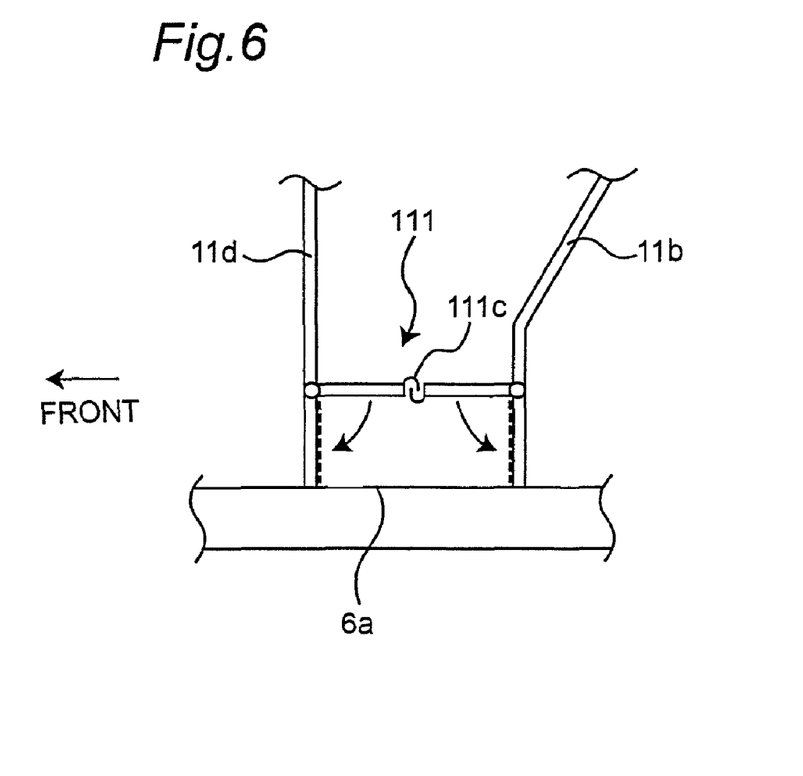
FIG. 6 is a left side schematic diagram of the load storing means which can separate the partition in an intermediate portion.

The partition 111 may be configured to be shiftably fixed to the vehicle body. As shown in FIG. 6, the partition 111 may be formed in a configuration that is separable at an intermediate portion 111c and can be shiftable at both ends about a horizontal shaft relative to the side frame member 11. In the non-expanded state, the coupling in the intermediate portion is released to divide the partition 111 in a front-rear direction. The divided partitions can be rotated about their fixed ends so that the leg space can be opened in a vehicle width direction. Part of the partition 111 is held in the state of being fixed to the vehicle body so that the loss of the partition 111 can be prevented and convenience can be improved.

In this manner, the partition 111 can be contracted in a longitudinal direction. Therefore, even if the size of the leg space in a front-rear direction is larger than the size of the leg space in an up-down direction, the obstruction of the partition 111 in the non-expanded state can be prevented. The fixed state to the side frame member 11 can be maintained.

The partition 111 may be fixed to the side frame member 11 by a magnet. In addition, a plurality of fixing portions may be formed in the side frame member 11 so as to permit adjustment of the attached position of the partition 111. With this configuration, the height of the partition 111 can be adjusted according to the particular load and the dropping of a load to the outside of the vehicle can be prevented.

The partition 111 is preferably located near the left or right outer panel in a vehicle width direction of the vehicle body. As a result, the load storing space P2 can be larger than the case in which the partition 111 is formed inward in a vehicle width direction rather than on the left or right outer panel surface and the quantity of the loads that are storable in the load storing space P2 can be increased.

The partition 111 may be additionally formed inside in a vehicle width direction or in a front-rear direction together with the left or right outer panel surface of the vehicle body in a vehicle width direction. This can prevent movement of a load in a vehicle width direction or in a front-rear direction in the leg space, and thereby load damage can be prevented.

The partition 111 is provided to form the load storing space P2 in the 2 passengers transformation, while the partition 111 may be attached in the 4 passengers transformation. The partition 111 can protect the legs of the passenger seated on the rear seat 22.

The partition 111 may be formed so as to be movable in a vehicle width direction. In this case, in the 2 passengers transformation, the partition 111 is moved to the left or right outer panel surface in a vehicle width direction to form the load storing space P2 in the leg space. In the 4 passengers transformation, the partition 111 is moved to the middle of the vehicle body in a vehicle width direction to open the leg space so that the passenger can easily enter and exit the rear seat 22.

The configuration of the partition 111 is not limited to the above configurations. Any configuration which can shift the partition 111 and partition the leg space in a vehicle width direction in the expanded state can be used.

Figure 7:
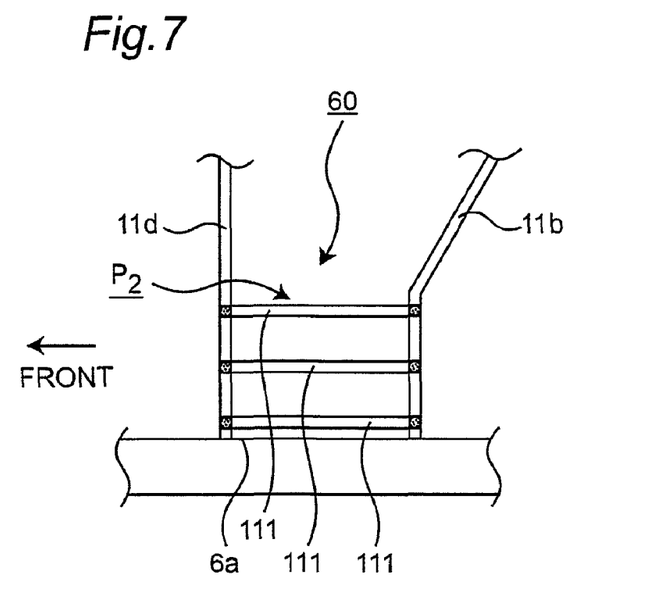
FIG. 7 is a left side schematic diagram of load storing means showing a modification example of the first embodiment.
Figure 8:
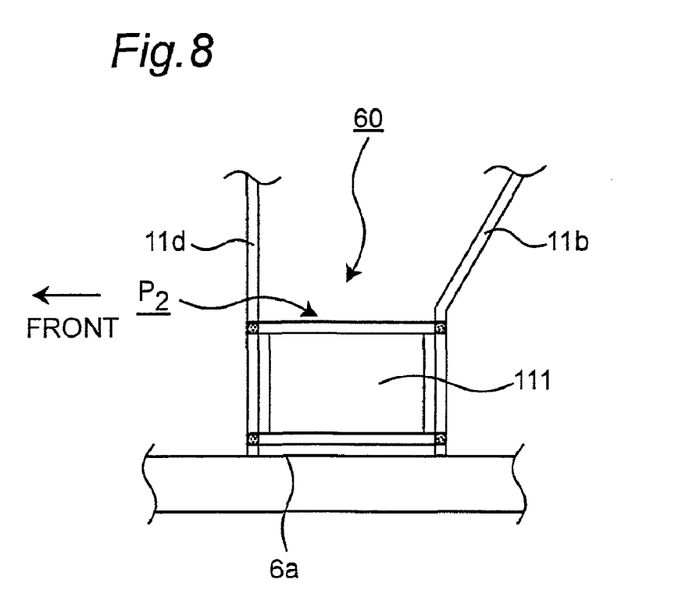
FIG. 8 is a left side schematic diagram of load storing means showing a modification example of the first embodiment.

FIGS. 7 to 10 are left side schematic diagrams of load storing means 60 showing a modification example of the first embodiment. As shown in FIG. 7, the arrangement of the partition 111 on each of the left and right sides is not limited. A plurality of (three in FIG. 7) partitions 111 can be provided on each of the left and right sides. As shown in FIG. 8, the partition 111 may be plate-shaped. When the partition 111 is plate-shaped, the dropping of a small load which can be dropped through the rod-shaped partition(s) can be prevented. The partition 111 can be constructed of various materials such as metal, resin, wood, rubber, and fiber.

Figure 9:
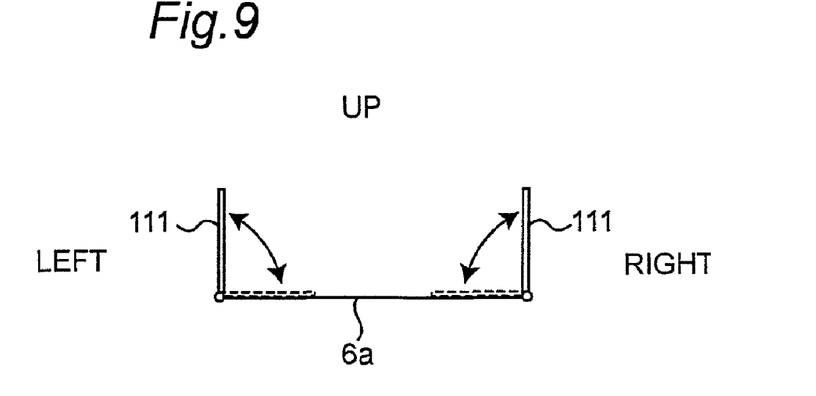
FIG. 9 is a sectional schematic diagram of load storing means showing a modification example of the first embodiment.

The partition 111 may be supported so as to be angle shifted relative to any one of the panel surfaces of the floor surface, the front surface, and the rear surface forming the leg space. FIG. 9 shows a sectional schematic diagram of load storing means in which the partition 111 can be supported so as to be angle shifted relative to the floor surface 6a. In this case, in the non-expanded state, the partition 111 is maintained so as to be overlapped with the floor surface 6a forming the leg space and cannot inhibit the passenger from entering and exiting the rear seat 22. In the expanded state, the partition 111 is angle shifted about the supporting portion of the floor surface 6a and the leg space can be partitioned in a vehicle width direction by the partition 111. The partition 111 may be fixed to the vehicle body and may also be separable from the vehicle body. In this case, the partition 111 is attached or detached according to the change between the expanded state and the non-expanded state.

Figure 10:
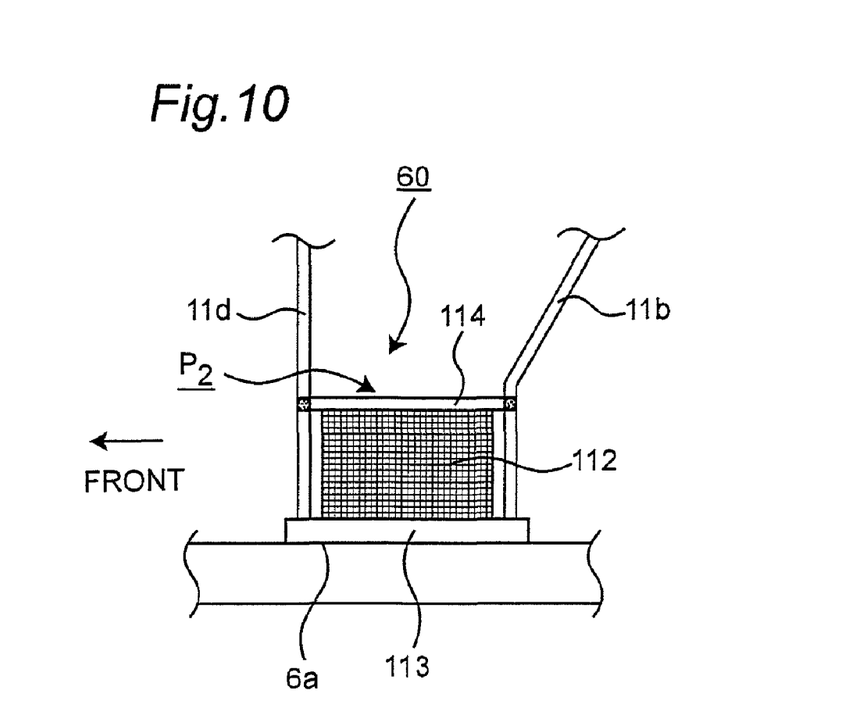
FIG. 10 is a left side schematic diagram of load storing means showing a modification example of the first embodiment.

As shown in FIG. 10, the load storing means 60 may be a windable roll screen. The load storing means 60 has a roll 112 made of a net member or a sheet member, and a roll winding device 113 located on the floor surface 6a. One end of the roll 112 is supported so as to be windable by the roll winding device 113 and an end bar 114, which is used when the roll 112 is drawn out and fixed, is provided at the other end of the roll 112. The end bar 114 can be fixed to the intermediate vertical portion 11d and the rear side portion 11b of the side frame member 11.

With the above configuration, in the 2 passengers transformation, the roll 112 is drawn out from the roll winding device 113 and the end bar 114 is fixed to the side frame member 11 to form the load storing space P2. When no loads are loaded in the load storing space P2 in the 2 passengers transformation or when the passenger enters and exits the rear seat 22 in the 4 passengers transformation, the roll 112 is wound by the roll winding device 113 so that the roll 112 cannot be an obstacle. The roll 112 can prevent the dropping of a small load which can be dropped through the rod-shaped partitions. The weight of the partition can be smaller than that of the plate-shaped partition.

Figure 11:
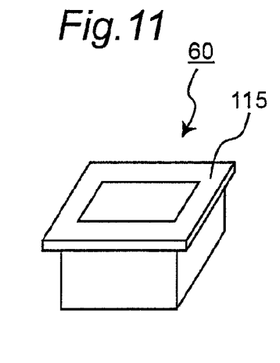
FIG. 11 is a schematic diagram of load storing means showing another modification example of the first embodiment.
Figure 12:
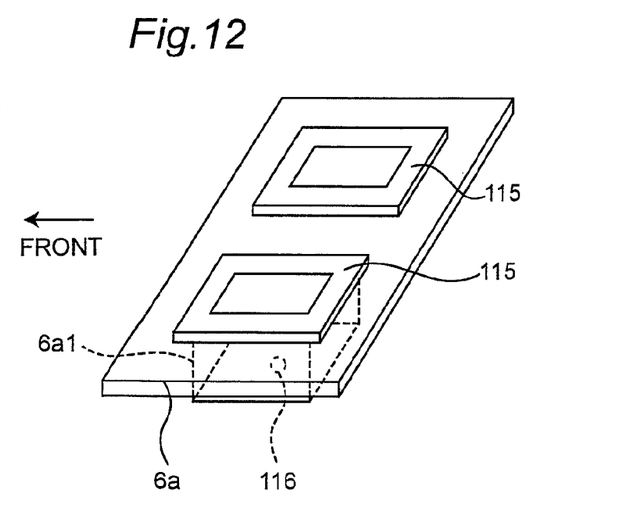
FIG. 12 is a schematic diagram showing the state that the load storing means is attached.
Figure 13:
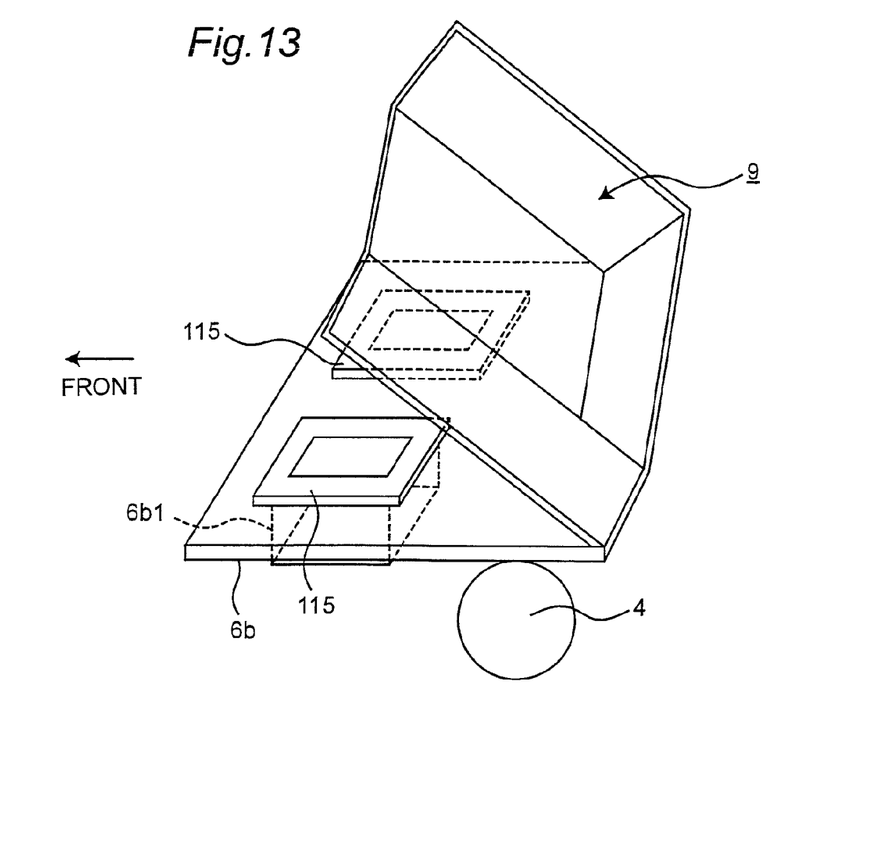
FIG. 13 is a schematic diagram showing the state that the load storing means is stored in a floor surface below the cargo bed.

FIGS. 11 to 13 are schematic diagrams of load storing means 60 showing another modification of the first embodiment. As shown in FIG. 12, a tray 115 for storing the load shown in FIG. 11 is attached to the floor surface 6a of the cabin 6.

The tray 115 is formed in a bottomed tubular shape opened upward. The tray 115 is formed so as to be detachable and housed in the leg space. The tray 115 is formed in a square tubular shape having about the same size in a front-rear direction and in a left-right direction as that of the leg space. The tray 115 shaped in a bottomed tubular shape can store a fluid and particulate substances without dirtying the bottom surface of the leg space. The tray 115 can be fixed in other than the leg space and the cargo bed space in the non-expanded state.

A space for fixing the tray is formed in the non-expanded state in the vehicle body. A space which can house the tray 115 may be formed in the space below the front seat 21. A tray housing space communicated with the leg space may be formed in the space below the front seat 21. With this configuration, the tray 115 can be arranged in the leg space only by sliding the tray 115 from the tray storing space. The tray housing space may be formed in the hood.

When the tray 115 is arranged in the leg space, a movement preventing configuration which prevents the tray 115 from moving in a vehicle width direction is preferably formed. As the movement preventing configuration of the tray 115, the partition 111 as described above may be used.

Since a load is stored in the tray 115, the partition 111 need not be provided on the side frame member 11. One tray extended to the left and right ends of the cabin 6 may be attached to the floor surface 6a according to the type of a load to be loaded. As shown in FIG. 12, two trays 115 may be attached side by side in a left-right direction. In addition, three or more trays may be attached.

The tray 115 is provided so as to be attachable to and detachable from the floor surface 6a of the cabin 6 so that in the 4 passengers transformation, the tray 115 is detached and cannot be an obstacle relative to the passenger seated on the rear seat 22. The cargo bed 9 can be in a dump state in which it is tilted rearward and downward. Thus, as shown in FIG. 13, the tray 115 can be housed in the floor surface 6b below the cargo bed 9 in the 4 passengers transformation.

The tray 115 in the non-expanded state may be arranged below the cargo bed 9, in a front hatch, or in other portions. In other than the leg space, a fixing portion which can fix the tray 115 is formed.

As shown in FIG. 12, a through hole 116 may be provided in the bottom plate of the tray 115 and the floor surface 6a of the cabin 6 on which the tray 115 is located. As a result, for example, rain flowing into the tray 115 is able to flow out from the through hole 116 so that accumulation of rain in the tray 115 can be prevented. To store a fluid and particulate substances, a cap closing the through hole 116 may be provided.

An insertion hole 6a1 in which the lower portion of the tray 115 is fitted is preferably formed in the floor surface 6a to which the tray 115 is attached. As a result, the tray 115 can be fixed to the floor surface 6a only by fitting the lower portion of the tray 115 in the insertion hole 6a1 of the floor surface 6a. Likewise, an insertion hole 6b1 in which the lower portion of the tray 115 is fitted is preferably formed in the floor surface 6b arranged below the cargo bed 9 and housing the tray 115.

Figure 14:
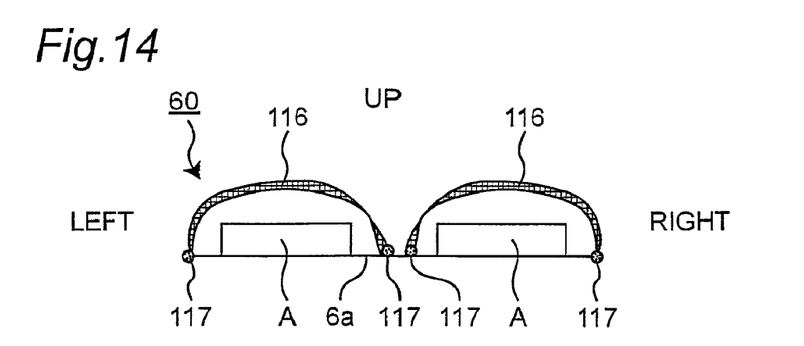
FIG. 14 is a sectional schematic diagram of load storing means showing yet another modification example of the first embodiment.
Figure 15:
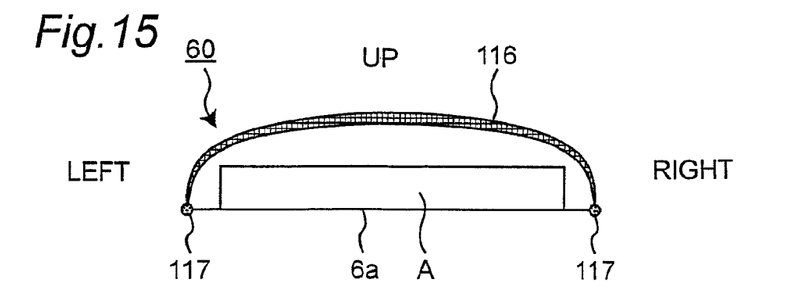
FIG. 15 is a sectional schematic diagram of load storing means showing yet another modification example of the first embodiment.
Figure 16:
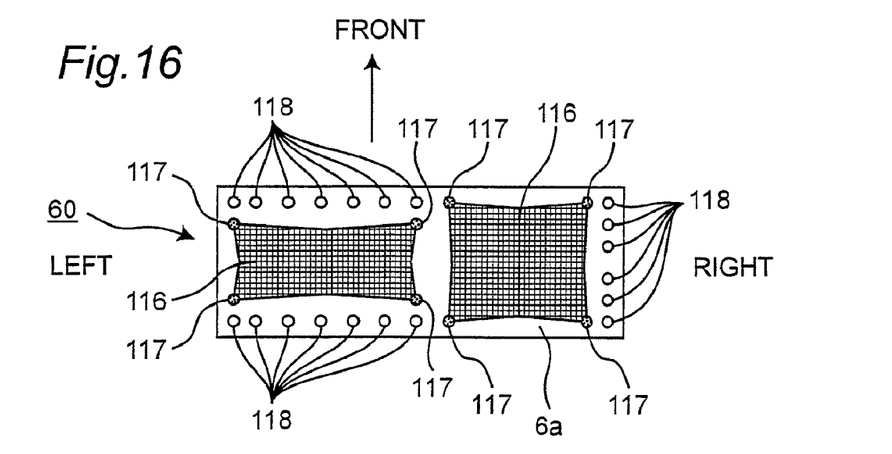
FIG. 16 is a top schematic diagram of load storing means showing yet another modification example of the first embodiment.

FIGS. 14 to 16 are schematic diagrams of the load storing means 60 showing another modification of the first embodiment. As shown in FIG. 14, two nets 116 for covering loads A are attached side by side in a left-right direction to the floor surface 6a of the cabin 6. Hooks 117 are attached to the ends of the nets 116. The hooks 117 are attached to the floor surface 6a so that the nets 116 are attached to the floor surface 6a.

According to this embodiment, the loads are held by the nets 116 and the partitions 111 need not be provided on the side frame members 11. As shown in FIG. 15, one net 116 extended to the left and right ends of the cabin 6 may be attached according to the type of load to be loaded. Alternatively, the net may be divided into three or more sections and attached. A plurality of attaching portions 118 for attaching the hooks 117 attached to the ends of the nets 116 to the floor surface 6a are provided on the floor surface 6a. With this configuration, the nets 116 in various shapes can be attached to various positions of the floor surface 6a. Accordingly, the loads in various shapes can be held on the floor surface 6a by the nets 116.

Figure 17:
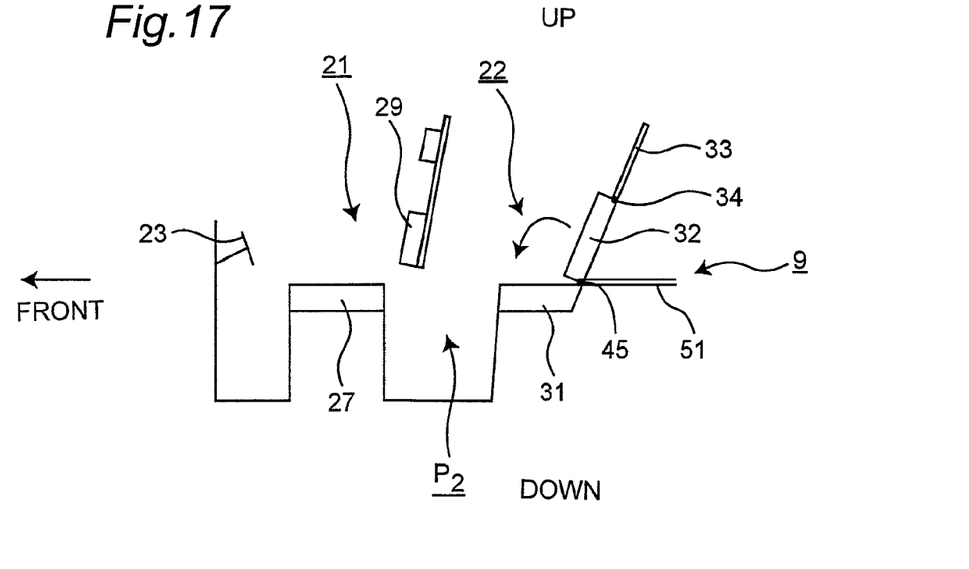
FIG. 17 is a left side schematic diagram of the pick-up style utility vehicle in the 4 passengers transformation according to a second embodiment of the present invention.
Figure 18:
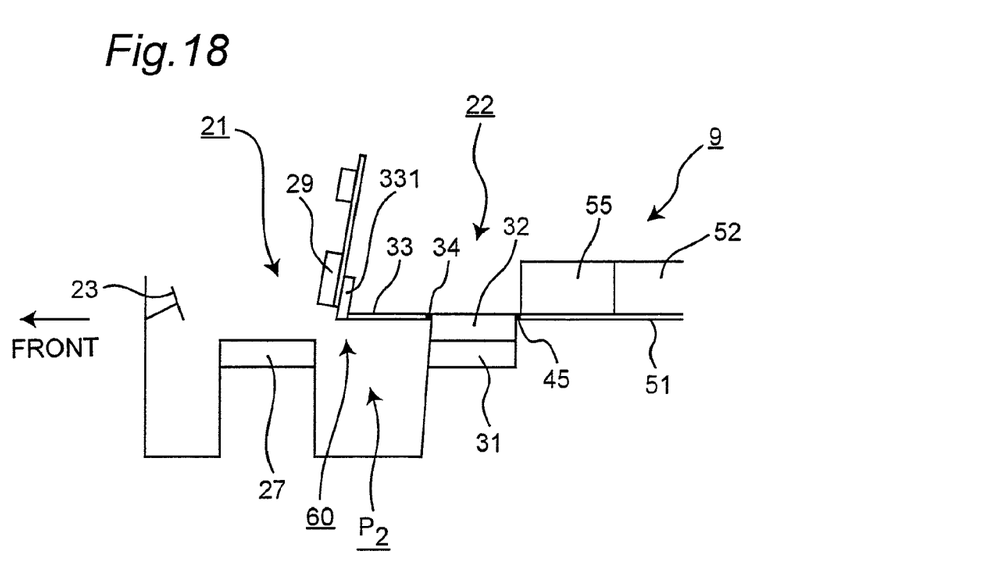
FIG. 18 is a left side schematic diagram of the pick-up style utility vehicle in the 2 passengers transformation.

FIGS. 17 and 18 are left side schematic diagrams of the pick-up style utility vehicle 1 according to a second embodiment of the present invention. The second embodiment has the same configuration as that of the first embodiment except that the following configurations (a) and (b) are different. Like components are indicated by like reference numerals. (a) As shown in FIG. 17, a plate-shaped member 33 is rotatably attached via a hinge 34 to the upper end of the backrest 32 of the rear seat 22. The plate-shaped member 33 can be expanded and contracted in an up-down direction as seen in FIG. 17. (b) The backrest 32 and the plate-shaped member 33 are rotated about the hinge 45 forward. As shown in FIG. 18, the backrest 32 is folded on the top surface of the seat bottom 31. In the second embodiment, the seat bottom 31 is not rotated forward in the 2 passengers transformation. The plate-shaped member 33 is fixed in a substantially horizontal state by the hinge 34 in front of the backrest 32 in a substantially horizontal state on the top surface of the seat bottom 31 so as to be on the same straight line as the backrest 32. Therefore, the plate-shaped member 33 serves as a cover covering the load storing space P2 and configures the load storing means.

According to the second embodiment, the backrest 32 and the plate-shaped member 33 can form the bottom plate of the expandable portion of the cargo bed 9. The plate-shaped member 33 is located in the upper portion of the load storing space P2, can cover the upper portion of a load stored in the load storing space P2, and can prevent the jumping of the stored load in an upward direction. The length of the expandable and contractible plate-shaped member 33 is extended and contracted so as to coincide with the length of the load storing space P2 in a front-rear direction so that the plate-shaped member 33 can cover the top surface of the load storing space P2 without a gap.

A bending portion 331 is provided at the end of the plate-shaped member 33. As shown in FIG. 18, in the 2 passengers transformation, the bending portion 331 is erected with respect to the plate-shaped member 33 in a substantially horizontal state so as to be brought into contact with the back surface of the backrest 29 of the front seat 21. The flowing of sand or the like from the cargo bed 9 into the load storing space P2 can be prevented.

In the above embodiment, the load storing space P2 is formed in the leg space of the rear seat 22. In addition to the leg space of the rear seat 22, the load storing space may be formed in the leg space on the passenger seat side of the front seat 21. The load storing means forming the leg space on the passenger seat side of the front seat 21 as the load storing space can have various configurations like the load storing means forming the leg space of the rear seat 22 as the load storing space.

Figure 19:
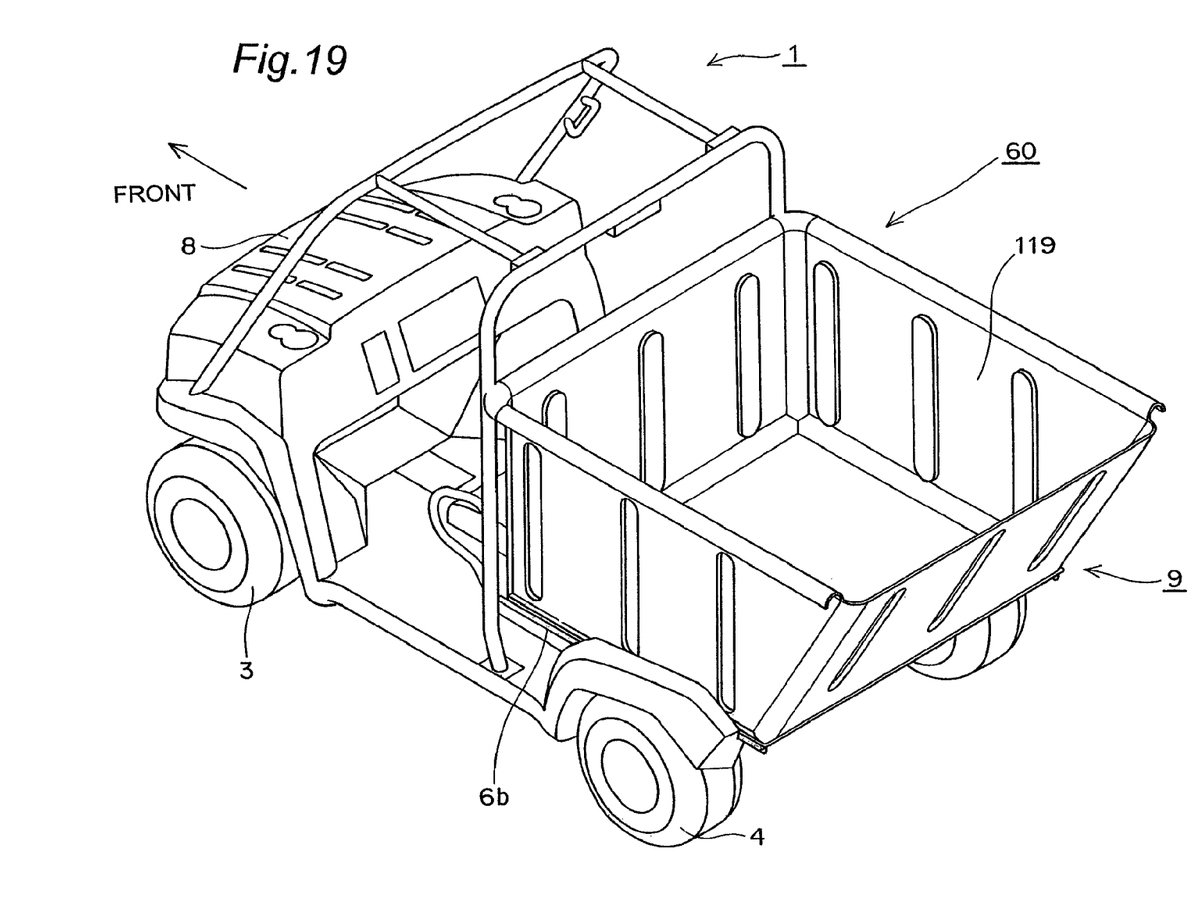
FIG. 19 is an overall perspective view of a pick-up style utility vehicle showing a modification example of the load storing means.

As shown in FIG. 19, the load storing means 60 may be a large tray 119 attached to the entire floor surface 6b of the cargo bed 9 in the expanded state of the cargo bed 9. In this case, the pick-up style utility vehicle 1 can be used as a garbage collecting car in big cities, amusement parks, department stores, and baseball fields. The cargo bed 9 of such a garbage collecting car can be dump so that garbage can be easily loaded into and unloaded from the tray 119 attached to the cargo bed 9.

The present invention is not limited to the configurations of the above embodiments and includes various modification examples contemplated in the scope without departing from the contents described in the scope of the claims.

what is claimed is:

1. A pick-up style utility vehicle comprising:
a front seat;
a rear seat; and
a cargo bed, wherein:
the front seat, the rear seat, and the cargo bed are located in this order from a front of the vehicle;
the cargo bed is changeable between an expanded state in which the cargo bed is expanded forward into a rear riding space in front of the cargo bed and a non-expanded state not occupying the rear riding space; and
the front seat, rear seat and cargo bed define a leg space of the rear seat in the non-expanded state and a load storing space in the expanded state;
the utility vehicle further includes a partitioning member that is changeable between a state in which only the leg space of the rear seat is partitioned from a left or right side outward of a vehicle body in the expanded state and a state in which the leg space of the rear seat is opened to the left or right side outward of the vehicle body in the non-expanded state; and
the rear seat is housed in a space different from the leg space in the expanded state.

2. The pick-up style utility vehicle according to claim 1, wherein the partitioning member is attached to a cabin frame surrounding the riding space in the expanded state and in the non-expanded state.

3. The pick-up style utility vehicle according to claim 1, wherein the partitioning member is formed along a left or right outer surface of the vehicle body.

4. The pick-up style utility vehicle according to claim 1, wherein the partitioning member has a rod shape.

5. The pick-up style utility vehicle according to claim 1, wherein a longitudinal size of the partitioning member is changeable.

6. The pick-up style utility vehicle according to claim 1, wherein the partitioning member has a plate shape.

7. The pick-up style utility vehicle according to claim 1, wherein the partitioning member has a windable roll screen shield.

8. The pick-up style utility vehicle according to claim 1, wherein the load storing means has a tray attachable to the vehicle body.

9. The pick-up style utility vehicle according to claim 8, wherein the tray can be housed below the cargo bed in the non-expanded state.

10. The pick-up style utility vehicle according to claim 1, wherein the load storing means has a net member attachable to the vehicle body.

11. The pick-up style utility vehicle according to claim 1, wherein an upper space of the leg space is opened to the left and right side outward of the vehicle body in the expanded state and in the non-expanded state.

12. The pick-up style utility vehicle according to claim 1, wherein the partitioning member is placed in front of the rear seat.

13. The pick-up style utility vehicle according to claim 1, wherein the vehicle does not include a door in the area of the rear seat so that passengers can easily enter and exit the rear seat without restriction.

14. The pick-up style utility vehicle according to claim 1, wherein:
the rear seat has a seat bottom and a backrest,
the partitioning member comprises a plate-shaped member,
the plate-shaped member is attached to the end of the backrest, and
the backrest is located on a top surface of the seat bottom in a substantially horizontal state in the expanded state and the plate-shaped member is extended forward from a front end of the backrest in a substantially horizontal state and is located in an upper portion of the load storing space.

15. A pick-up style utility vehicle comprising:
a front seat;
a rear seat; and
a cargo bed; wherein:
the front seat, the rear seat and the cargo bed are positioned in this order from a front of the vehicle,
the cargo bed is changeable between an expanded state in which the cargo bed is expanded forward into a rear riding space in front of the cargo bed and a non-expanded state not occupying the rear riding space,
the utility vehicle has load storing means forming a leg space of the rear seat in the non-expanded state, and the rear seat is housed in a space different from the leg space in the expanded state,
the load storing means includes a partitioning member that is changeable between a state in which the leg space of the rear seat is partitioned from a left or right side outward of a vehicle body in the expanded state and a state in which the leg space of the rear seat is opened to the left or right side outward of the vehicle body in the non-expanded state, and
the partitioning member is disposed below a seating surface of the rear seat in the non-expanded state, and in a state in which the leg space of the rear seat is partitioned from a left or right side outward of a vehicle body.

16. The pick-up style utility vehicle according to claim 15, wherein the vehicle does not include a door in the area of the rear seat so that passengers can easily enter and exit the rear seat without restriction.

* * * * *